(12) United States Patent
Machulsky et al.

(10) Patent No.: US 10,521,377 B1
(45) Date of Patent: *Dec. 31, 2019

(54) REDUCING READ TRANSACTIONS TO PERIPHERAL DEVICES

(71) Applicant: Amazon Technologies, Inc., Seattle, WA (US)

(72) Inventors: Georgy Machulsky, San Jose, CA (US); Nafea Bshara, San Jose, CA (US); Netanel Israel Belgazal, Qiryat Bialik (IL); Said Bshara, Tira (IL); Evgeny Schmeilin, Haifa (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/197,289

(22) Filed: Nov. 20, 2018

Related U.S. Application Data

(63) Continuation of application No. 15/087,781, filed on Mar. 31, 2016, now Pat. No. 10,140,227.

(51) Int. Cl.
*G06F 13/28* (2006.01)
*G06F 13/42* (2006.01)

(52) U.S. Cl.
CPC .......... *G06F 13/28* (2013.01); *G06F 13/4221* (2013.01)

(58) Field of Classification Search
None
See application file for complete search history.

(56) References Cited

PUBLICATIONS

U.S. Appl. No. 15/087,781, "Corrected Notice of Allowability", dated Oct. 29, 2018, 2 pages.
U.S. Appl. No. 15/087,781, "Corrected Notice of Allowability", dated Sep. 28, 2018, 2 pages.
U.S. Appl. No. 15/087,781, "Notice of Allowance", dated Jul. 5, 2018, 10 pages.
U.S. Appl. No. 15/087,781, filed Mar. 31, 2016, titled: Reducing Read Transactions to Peripheral Devices.

*Primary Examiner* — Idriss N Alrobaye
*Assistant Examiner* — Dayton Lewis-Taylor
(74) *Attorney, Agent, or Firm* — Kilpatrick Townsend & Stockton LLP

(57) ABSTRACT

A first write transaction is received by a device that includes a transaction identifier and a memory location identifier. The memory location identifies a register or a memory location of a device. A value from the register or memory location is read. A second write transaction is sent to a block of host memory. The second write transaction includes the value and the transaction identifier.

20 Claims, 8 Drawing Sheets

REDUCING READ TRANSACTIONS TO PERIPHERAL DEVICES

CROSS-REFERENCE TO RELATED APPLICATIONS

This application is a continuation of U.S. patent application Ser. No. 15/087,781, filed Mar. 31, 2016, issued as U.S. Pat. No. 10,140,227 on Nov. 27, 2018, and entitled "Reducing Read Transactions to Peripheral Devices," the content of which is incorporated herein by reference in its entirety.

BACKGROUND

Computing systems may include host processors and peripheral devices. Peripheral devices may add to or change the functionality of the computing system. In many cases, peripheral devices are connected to the host processor using an interconnect. The interconnect may implement a standard bus protocol, such as any of the Peripheral Component Interconnect (PCI) family of bus protocols. At times, the host processor needs to read and/or write to a memory location of a peripheral device using the interconnect.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems, devices, and methods of the disclosure describe transferring data from a peripheral device to a memory in a "readless operation." In a particular implementation, a computing system includes a host processor, a host memory, and a peripheral device, which are interconnected by a PCI-based bus. Conventionally, the host processor would send a read transaction over a PCI-based bus to read data that is stored on the PCI-based device. However, if a PCI-based device is reset while outstanding read transactions are still on the PCI-based bus, a fatal error is sometimes registered causing the system to crash. The embodiments of this disclosure describe a "readless operation" utilizing two write transactions in place of a read transaction. This may reduce the fatal errors and instances of system failures on the bus by reducing the read transactions that are potentially outstanding.

In an example embodiment, a host processor sends a first write transaction to a peripheral device over a PCI-based bus. The first write transaction includes a transaction identifier and memory location of the peripheral device that the host processor would like to read. The write transaction may be written to a pre-determined register in a memory of the peripheral device. The peripheral device will read the value from the register or memory location that the host processor wanted to read and send that value to a host memory of the host processor in a second write transaction. The second write transaction also includes the transaction identifier sent in the first write transaction. The host processor can then look at the transaction identifier in the second write transaction and determine that the value that is also included in the second write transaction was the value it requested from the device's memory location in the first write transaction that included that same transaction identifier.

Figure 1:
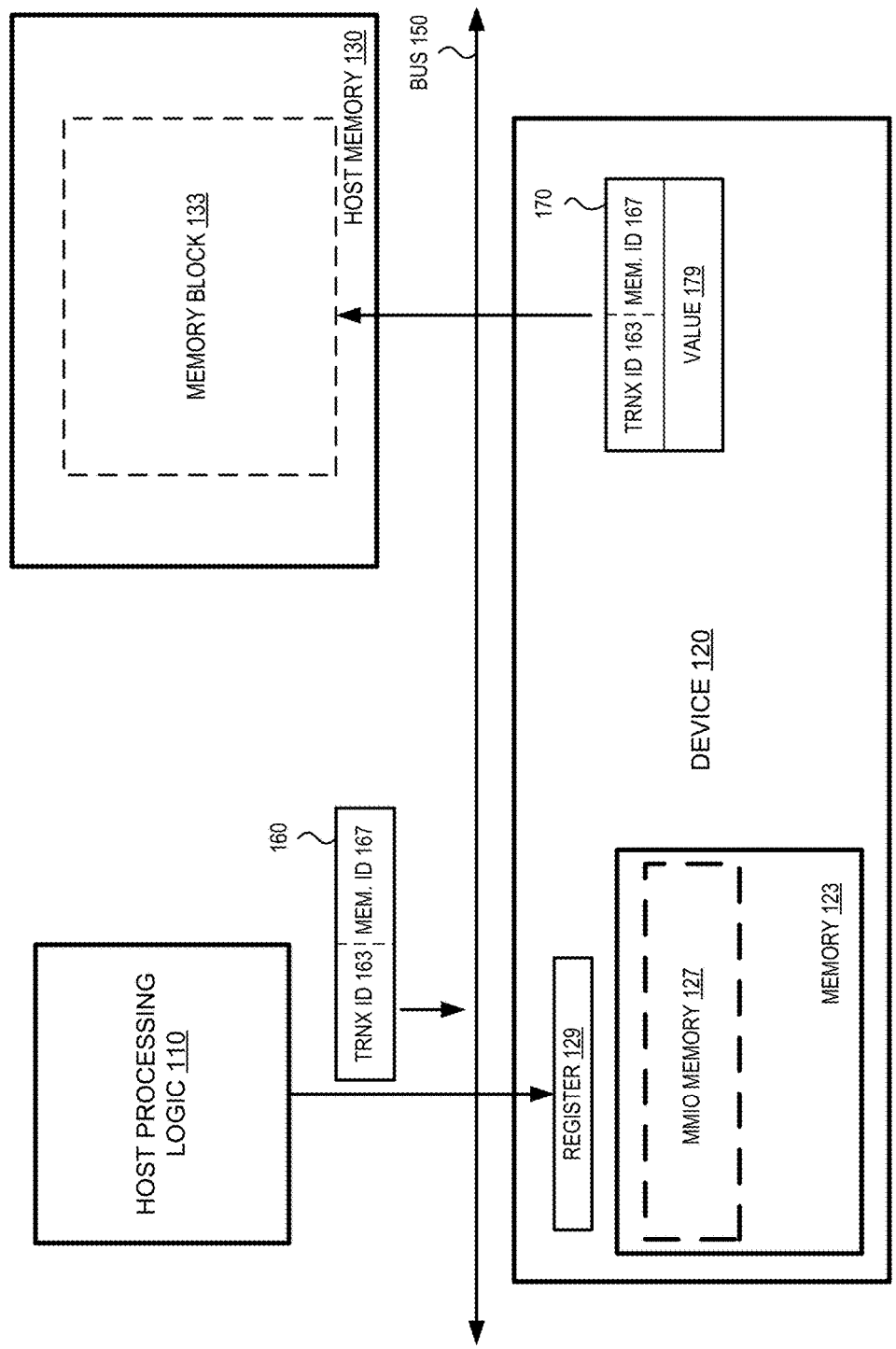
FIG. 1 illustrates a hybrid block diagram flow showing an example process of transferring data from a peripheral device to a host memory.

FIG. 1 illustrates a hybrid block diagram flow showing an example process of transferring data from a peripheral device to a host memory. FIG. 1 includes host processing logic 110, a device 120, a host memory 130, and a bus 150. In one embodiment, a "host" includes host processing logic 110 and host memory 130. Although FIG. 1 includes blocks to represent particular hardware, the electrical connections illustrated in FIG. 1 are not necessarily complete as FIG. 1 is presented to show the flow of a process that includes the illustrated hardware components.

Host processing logic 110 may include one or more processors, microprocessors, field-programmable gate arrays (FPGAs) or other suitable processing logic. The processors may be general purpose computing devices such as are manufactured by Intel®, AMD®, ARM®, Qualcomm®, and others. The processors are generally capable of executing software code. A processor may include multiple processing cores.

The host memory 130 may provide temporary or long-term storage for data that may be accessed by host processing logic 110. The host memory 130 may include Dynamic Random Access Memory (DRAM), Synchronous DRAM (SDRAM), and/or Double Data Rate (DDR), among others. In some cases, host memory 130 may also include Read-Only Memory (ROM), such as Programmable Read-Only Memory (PROM), Erasable Programmable Read-Only Memory (EPROM), Electrically Erasable Programmable Read-Only Memory (EEPROM), and/or Flash EEPROM, among others.

Bus 150 in FIG. 1 may be any suitable bus for writing data from host processing logic 110 to device 120. Bus 150 is also used for writing data from device 120 to host memory 130, as will be described in more detail below. Bus 150 implements one or more variations of the Peripheral Component Interconnect (PCI) standard bus protocols, in some embodiments. A bus is a communication channel that transfers data within a computing system, or between a computing system and other devices. A standard bus protocol is a data transfer protocol for which a specification has been defined and adopted by various manufacturers. Manufacturers ensure that compliant devices are compatible with computing systems implementing the bus protocol, and vice versa. PCI describes a family of related, standardized bus protocols. PCI includes the original PCI standard, PCI-eXtended (PCI-X), Accelerated Graphics Port (AGP), and PCI Express (PCIe, also referred to as PCI-XP). The term "PCI" or "PCI-based" may be used herein to describe any protocol in the PCI family of bus protocols. In the example shown in FIG. 1, PCI is provided as an example of a bus protocol that can be implemented by a computing system to connect to peripheral devices. A computing device can use other bus protocols, such as for example, Industry Standard Architecture (ISA), Extended ISA (EISA), Video Electronics Standards Association (VESA), Micro Channel, and any of the Advanced Technology Attachment (ATA) family of protocols, among others. The illustrated example can also be implemented with a combination of standard bus protocols, a combination of proprietary bus protocols, and/or a combination of standard and proprietary bus protocols.

Device 120 receives a write transaction from host processing logic 110 over bus 150 and sends a write transaction to host memory 130 over the bus 150. Device 120 may be a "peripheral device" in a computing system. Peripheral devices are devices that can generate and/or respond to data transactions. For example, peripheral devices may be "requesters" (transaction generators) and/or "completers" (transaction responders). In PCI implementations, peripheral devices may include PCIe endpoints, where "endpoint" describes a peripheral device that is configured to communicate using a PCI protocol. Device 120 may be a PCI-based endpoint in that it is configured to interface with a PCI-based bus 150.

Device 120 includes a memory 123, in FIG. 1. A portion of memory 123 may be reserved for Memory-Mapped Input/Output (MMIO) write transactions initiated by host processing logic 110. MMIO refers to using a same addressing scheme on a same bus (e.g. bus 150) so that a processing logic (e.g. host processing logic 110) may address both a memory (e.g. host memory 130) and additional devices (e.g. device 120) using the same addressing scheme and the same bus. MMIO memory 127 in memory 123 is reserved for MMIO, in FIG. 1. Reserved register 129 is reserved for receiving writes that are part of the disclosed "readless operation." In the illustrated implementation, reserved register 129 is separate from memory 123. Reserved register 129 may be mapped as in the MMIO space and configured to receive MMIO write transactions. Alternatively, a reserved memory location in MMIO memory 127 may be used instead of reserved register 129 to received write transactions as part of the disclosed "readless operation." MMIO memory 127 may be reserved in an initialization process upon startup of a computing system, for example.

As noted above, a host processor may need to access data stored on a device. Typically, a host processor would generate a read transaction for transmission over a bus. The read transaction would include an address that the host processor wanted to read. The device would provide the value stored at the address in a read response and send the read response to the host processor over the bus. However, if a peripheral device was reset before the read response was sent (it was still outstanding), it was likely to crash the computing system because of a bus failure. In order to reduce the system failures due to outstanding read responses, this disclosure describes using two write transactions to accomplish the same or similar function of a host reading data that is stored on the device. The concept of reading data using two write transactions may be referred to as a "readless operation" in the disclosure. The "readless operation" includes a first write transaction from the host processing logic 110 to the device 120 (over bus 150) and a second write transaction from the device 120 to the host memory 130 (also over bus 150).

To perform the readless operation, host processing logic 110 may send a first write transaction 160 to device 120 over the bus 150. The first write transaction 160 may include a transaction identifier 163 and a memory location identifier 167. The first write transaction may be received at a bus interface of device 120, such as bus interface 244 which will be described in FIG. 2. The transaction identifier 163 and the memory location identifier 167 may be written to reserved register 129 that is pre-determined to receive data from write transactions that are part of a "readless operation." Reserved register 129 may be allocated specifically for receiving the first of two write transaction in the readless operation. The allocation may occur in an initialization process during startup of the computing system that includes host processing logic 110, device 120, host memory 130, and bus 150. Reserved register 129 may be an MMIO register and the first write transaction 160 may be an MMIO write transaction.

When device 120 determines that data (transaction identifier 163 and memory location identifier 167) has been written to reserved register 129 or a memory location in MMIO memory 127, device 120 reads a value 179 at the memory location or register identified by memory location identifier 167. In one embodiment, transaction identifier 163 and memory location identifier 167 is included in a 32-bit data message. In one embodiment, transaction identifier 163 and memory location identifier 167 is included in a 64-bit data message. In one embodiment, the memory location identifier is an offset value. Including an offset value rather than the entire register or memory address may shrink the required size of memory location identifier 167.

The memory location to be read by device 120 is located in memory 123 or a register of device 120, but is not necessarily located in MMIO memory 127 or an MMIO mapped register. In one example, the memory location includes a packet that has been received by device 120. The value 179 read from the memory location or register is included with the same transaction identifier 163 in a second write transaction 170 from device 120 to host memory 130 over bus 150. The transaction identifier 163 is included with the value 179 so that when the value 179 is stored in host memory 130, the host processing logic 110 can identify the value 179 as being the response to the first write transaction 160 that also included the same transaction identifier 163. Memory location identifier 167 may also be included in the second write transaction 170 as a further validation factor, as shown in FIG. 1. Memory location identifier 167 acts as an additional validation factor because host processing logic may also read memory location identifier 167 from second write transaction 170 to confirm that value 179 is responsive to the first write transaction 160.

In one embodiment, the second write transaction 170 is a direct memory access (DMA) write transaction in that the write transaction is not received by host processing logic 110. The DMA write transaction may be executed by a DMA engine or generally by a combination of hardware and firmware operating on the device 120. The second write transaction 170 is written to a pre-determined block of memory 133 in host memory 130. A read response address that indicates the start of memory block 133 may be sent to the device 120 prior to the first write transaction 160 so that the device 120 knows where to write its "responses" (the second write transaction 170) to the first write transaction 160. In one embodiment, host processing logic 110 sends the read response address to device 120 during an initialization process upon startup of the computing system.

Since host processing logic 110 pre-determines the block of memory 133 that the "responses" will be written to, host processing logic 110 can read the registers in memory block 133 to access value 179, transaction identifier 163, and (optionally) memory location identifier 167. Host processing logic 110 may read the transaction identifier 163 and corresponding value 179 from memory block 133. Host processing logic 110 may match the transaction identifier 163 with the first write transaction 160 because the first write transaction included transaction identifier 163 and then treat value 179 as the "read" value that is responsive to the first write transaction 160. Host processing logic 110 may then execute a function that utilizes value 179. In one example, value 179 is packet data received by device 120. The packet data may then be parsed or operated on by host processing logic 110.

Host processing logic 110 may have a driver running on an operating system of host processing logic 110. The driver may be for interacting with device 120. In one embodiment, the driver is responsible for transmitting the first write transaction 160 and reading the value 179 sent to memory block 133. In one embodiment, the driver will send first write transaction 160 and wait for a timeout period for the value 179 to be written to memory block 133. After the timeout period, the driver may simply give up on or cancel the transaction. In a different embodiment, after the timeout period, the driver will transmit a subsequent (third) write transaction to device 120 over the bus 150. The third write transaction includes a retransmission transaction identifier that is different than the transaction identifier 163, but the third write transaction still includes memory location identifier 167. In this way, the driver is essentially resending the first write request, but with a different transaction identifier.

The disclosed readless operation may be asynchronous or synchronous. In an asynchronous implementation, host processing logic 110 sends the first write transaction 160 over the bus 150 and after the first write transaction is received by device 120, the bus 150 is open for other transactions. In a synchronous implementation, once the first write transaction 160 is transmitted, host processing logic 110 is blocked as it waits for an answer to the first write transaction. Host processing logic 110 may poll memory block 133 for an indication that a value has been written. Once host processing logic 110 determines that a value has been written to the memory block 133, host processing logic 110 unblocks the bus 150 so that other bus transactions may commence. The synchronous implementation is more like that of the conventional read transactions on bus 150.

Figure 2:
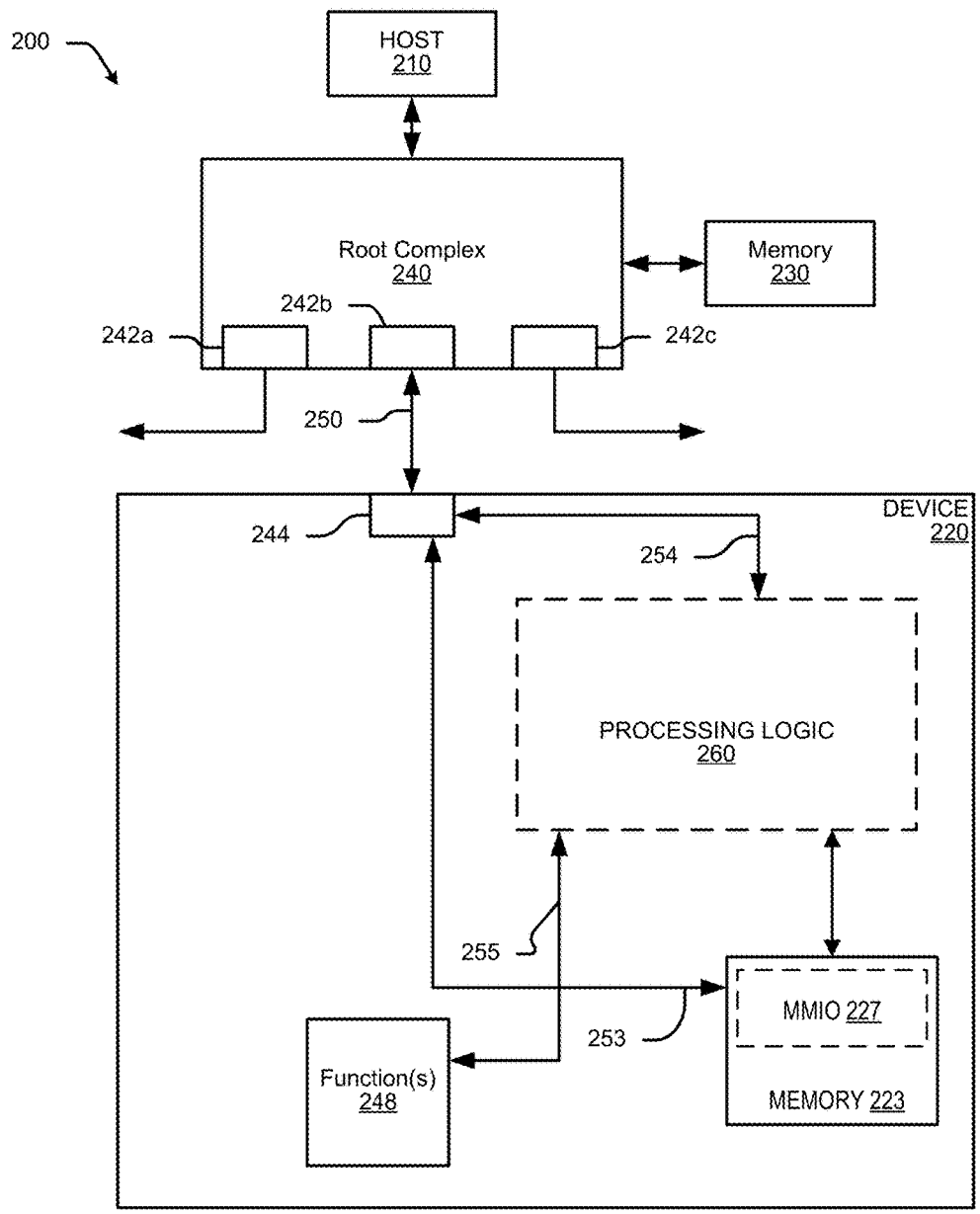
FIG. 2 illustrates an example of a computing system including a host, a memory, and a device being interconnected.

FIG. 2 illustrates an example of a computing system 200 including host processing logic 210, a memory 230, and a device 220. Host processing logic 210 is an example of host processing logic 110 and device 220 is an example of a device 120. Memory 230 may be used as host memory to host processing logic 110. In the illustrated example, the device 220 is in communication with a root complex 240 over a PCI interconnect 250. PCI interconnect 250 is one example of bus 150. The root complex 240 is in communication with host processing logic 210 and a memory subsystem 230. In some implementations, the root complex 240 may include a memory controller to manage transactions to and from memory 230. In other implementations, host processing 210 may include a memory controller. First write transaction 160 and second write transaction 170 may be routed to peripheral devices and/or memory 230 via root complex 240.

Memory subsystem 230 provides temporary or long-term storage for data that may be used by the computing system 200. The root complex 240 may include one or more ports 242a-c. These ports 242a-c may be connected, using additional PCI interconnects, to PCI switches, bridges, and endpoints, including the illustrated device 220, which may be a PCI endpoint. The root complex 240 may route transactions between the host processing logic 210 and any of the endpoints, switches, or bridges, or between the endpoints, switches, and bridges themselves. In this example, PCI is used as an example of a bus protocol that may be implemented by the computing system 200 to connect to peripheral devices. In various implementations, the computing system 200 can alternatively or additionally connect to peripheral devices using other bus protocols, such as SCSI, SATA, or PATA, among others, or a combination of different bus protocols including PCI.

The illustrated device 220 in this example includes a bus interface 244, which may be a PCI-based bus interface configured to send and receive data on a PCI-based bus. Bus interface 244 may include a physical interface for connecting to a cable, socket, port, or other connection to the PCI interconnect 250. The bus interface 244 may further include hardware and/or software to manage incoming and outgoing transactions. The bus interface 244 may translate an internal transaction generated by function(s) 248 or processing logic 260 into a PCI transaction for transmission over the PCI interconnect 250. The bus interface 244 may further translate transactions received over the PCI interconnect 250 for transfer to function 248 or to processing logic 260.

Processing logic 260 may include one or more processors, microprocessors, field-programmable gate arrays (FPGAs) or other suitable processing logic. The processors may be general purpose computing devices such as are manufactured by Intel®, AMD®, ARM®, Qualcomm®, and others. Processing logic 260 is generally capable of executing software code. A processor may include multiple processing cores.

Memory 123 may include Dynamic Random Access Memory (DRAM), Synchronous DRAM (SDRAM), and/or Double Data Rate (DDR), among others. In some cases, host memory 130 may also include Read-Only Memory (ROM), such as Programmable Read-Only Memory (PROM), Erasable Programmable Read-Only Memory (EPROM), Electrically Erasable Programmable Read-Only Memory (EEPROM), and/or Flash EEPROM, among others.

Device 220 includes function(s) 248, in the illustrated embodiment. Function(s) 248 may include hardware and/or software that provide one or more services for the device 220. A service in this context describes the operations and capabilities of the device 220, and the functionality that the device 220 provides to the computing system 200. Where device 220 is a network interface, function(s) 248 may include the hardware and/or software to provide a network interface, including ports for connecting Category-5 (CAT-5) cables, and/or antennas for connecting wirelessly to a network. The internal interconnect 254 that connects processing logic 260 with bus interface 244 may be implemented using a standard bus protocol, such as Coherent Hub Interface (CHI), Advanced eXtensible Interface (AXI), Advanced High-Performance Bus (AHB), or the like. The internal interconnect 254 may also be implemented using a proprietary bus protocol. In one example, an internal interconnect 253 connects bus interface 244 with memory 223 and bus interface 244 can write data to memory 223 without going through processing logic 260. Internal interconnect 253 may use the same bus protocol as internal connect 254. In one embodiment, an internal interconnect 255 connects processing logic 260 with Function(s) 248. Internal interconnect 255 may use the same bus protocol as internal connect 254.

Figure 3:
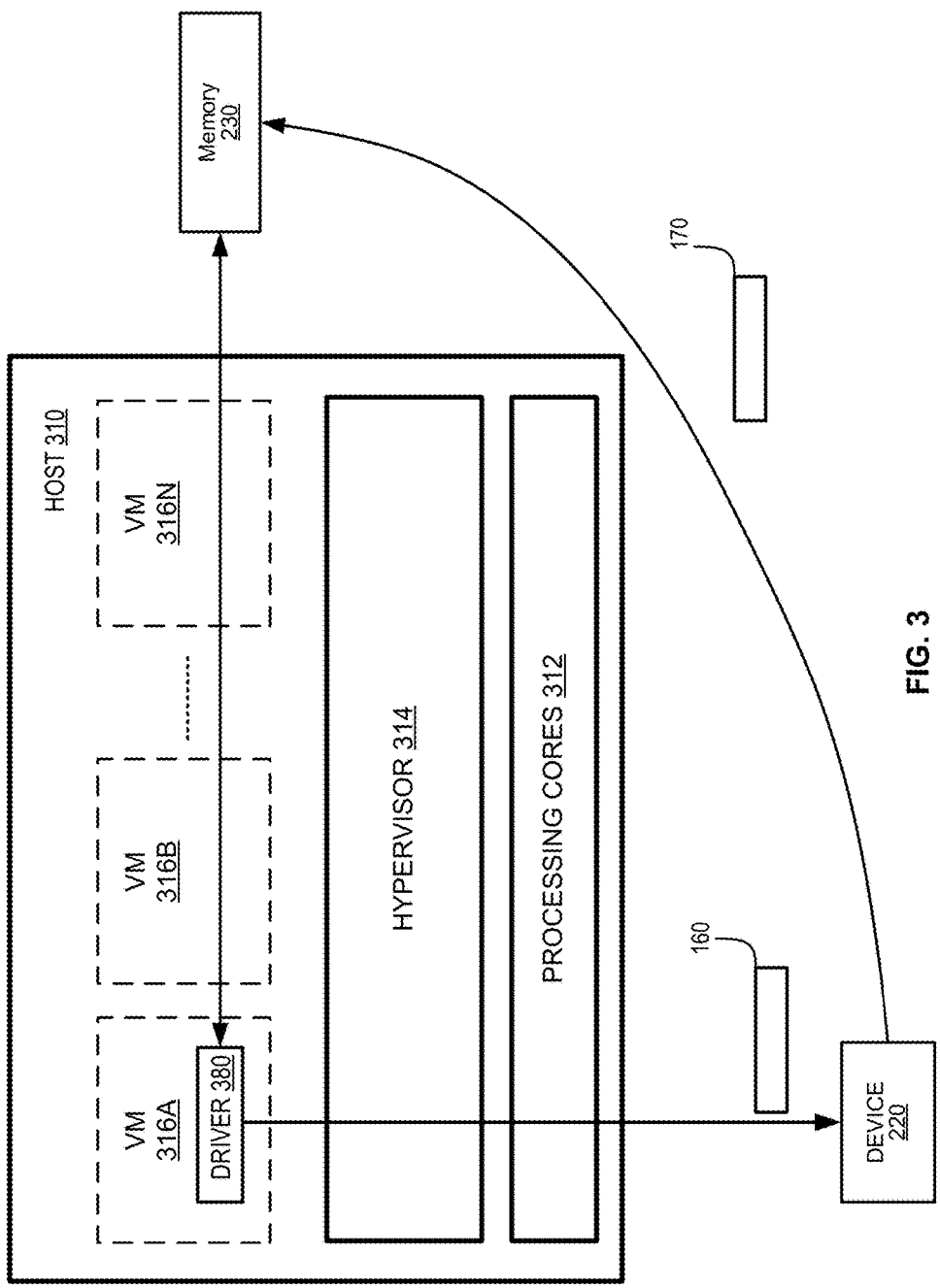
FIG. 3 illustrates an example host that includes processing cores and is running a plurality of virtual machine instances.

FIG. 3 illustrates an example host 310 that includes processing cores 312 and is running a plurality of virtual machine instances 316. Host 310 may be used in place of host processing logic 110/210, in some embodiments. In some implementations, host 310 may provide different services such as compute services, network services, etc. to various clients. For example, the compute services may include providing virtual or physical resources to the client computers, e.g., by launching virtual machine instances of various sizes, associating storage volumes to the virtual machines on demand, providing client computers with resources to run applications by renting virtual machines, data processing, storage, etc. The network services may include network related functionalities such as network traffic shaping, network acceleration, network storage processing, network switching, etc. A plurality of virtual machines 316A-316N, e.g., a first virtual machine 316A, a second virtual machine 316B, and a Nth virtual machine 316N, may be configured to run on host 310. For example, each of the virtual machines may execute a respective guest operating system (not shown) on host 310.

Host 310 includes a hypervisor 314 and processing cores 312. The processing cores 312 may include a plurality of processing cores that may be configured to execute a plurality of instructions that may be stored in a computer readable storage medium (not illustrated). The computer-readable storage medium may be non-transitory. In some instances, the computer readable medium may be part of a host memory such as memory 230, e.g., RAM, ROM, EEPROM, flash memory, or any suitable storage media. In some instances, the host 310 may include an x86 CPU platform, e.g., Xeon, Pentium, etc., an ARM platform, or a PowerPC platform, etc. for running an operating system (not shown). The hypervisor 314 may be configured to manage one or more virtual machines on the host 310, e.g., to create, start, monitor, stop or to delete the virtual machines 316A-316N. The hypervisor 314 can also manage the flow of information between software, the virtualized hardware, and the physical hardware.

In the illustrated embodiment, VM 316A executes driver 380, which is for interacting with device 220. Of course, any of the virtual machine may execute their own similar drivers to send their own first write transactions to device 220. When each virtual machine executes their own drivers, those drivers may also determine when the value requested from the device 220 is written to a certain memory block (by a second write transaction) that is specific to that driver. In one embodiment, virtual machine 316A-316N can be configured to program the device 220 with a DMA address that is specific to their respective guest operating system physical address or virtual address within host memory 230. In other embodiments, hypervisor 314 or a driver domain separate from hypervisor 314 executes driver 380. In one embodiment, driver 380 is included in an operating system in a bare-metal environment. Driver 380 initiates the first write transaction 160 that includes transaction identifier 163 and memory location identifier 167, in some embodiments.

Figure 4:
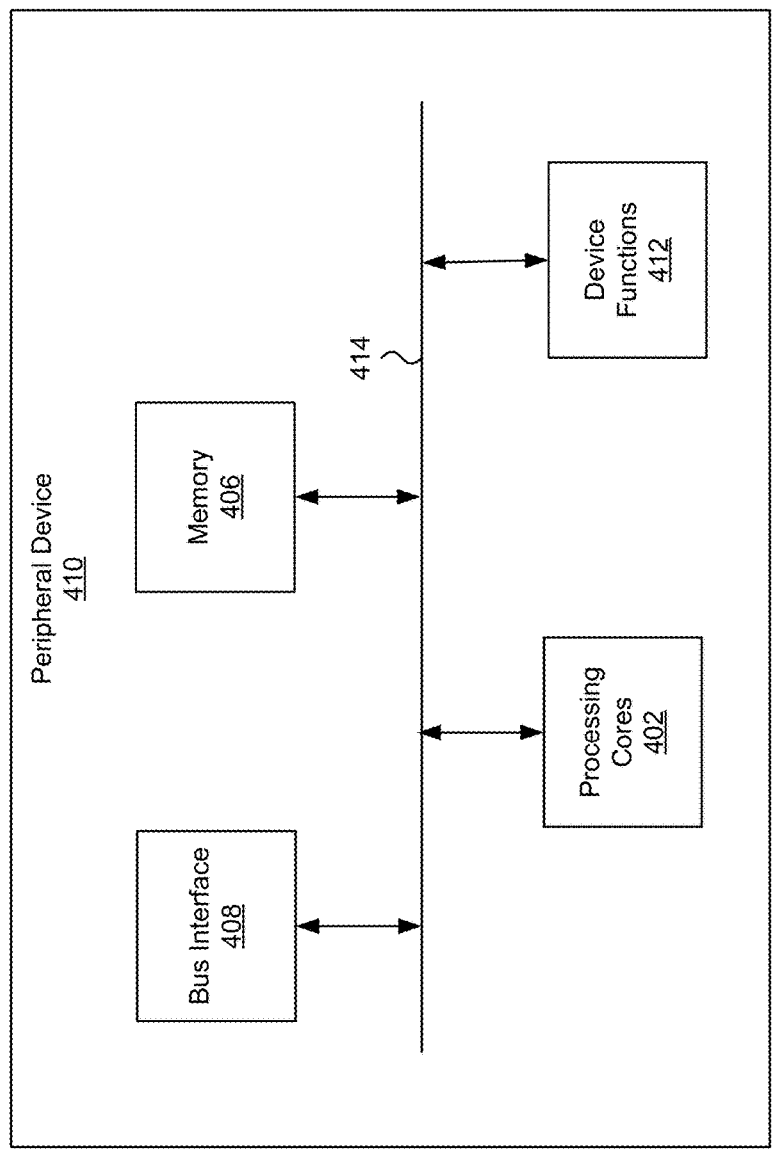
FIG. 4 illustrates an example architecture of a peripheral device that may be used in embodiments of the disclosure.

FIG. 4 illustrates an example architecture of a peripheral device 410 that may be used in embodiments where devices 120/220 are peripheral devices. Peripheral device 410 includes processing cores 402, a bus interface 408, memory 406, and device functions 412. These modules may be hardware modules, software modules, or a combination of hardware and software. Peripheral device 410 may include additional modules, not illustrated here. In some implementations, peripheral device 410 may include fewer modules. In some implementations, one or more of the modules may be combined into one module. One or more of the modules may be in communication with each other over a communication channel 414. The communication channel 414 may include one or more busses, meshes, matrices, fabrics, a combination of these communication channels, or some other suitable communication channel.

The processing cores 402 may include one or more processors configured to execute instructions. Examples of processors that may be included in the processing cores 402 include processors developed by ARM®, MIPS®, AMD®, Intel®, Qualcomm®, and the like. In some implementations, the processors of the processing cores 402 may share certain resources, such as for example busses, level 1 (L1) caches, and/or level 2 (L2) caches. The instructions executed by the processing cores 402 may be stored on a computer-readable storage medium, for example, in the form of a computer program. The computer-readable storage medium may be non-transitory. In some cases, the computer readable medium may be part of the memory 406.

The memory 406 may include either volatile or non-volatile, or both volatile and non-volatile types of memory. The memory 406 may, for example, include random access memory (RAM), read-only memory (ROM), Electrically Erasable Programmable Read-Only Memory (EEPROM), flash memory, and/or some other suitable storage media.

The bus interface 408 may enable communication with external entities, such as a host device and/or other components in a computing system, over an external communication medium. The bus interface 408 may include a physical interface for connecting to a cable, socket, port, or other connection to the external communication medium. The bus interface 408 may further include hardware and/or software to manage incoming and outgoing transactions. The bus interface 408 may implement a local bus protocol, such as NVMe, AHCI, SCSI, SAS, SATA, PATA, or some other standard protocol, or a proprietary bus protocol. The bus interface 408 may include at least the physical layer for any of these bus protocols, including a connector, power management, and error handling, among other things. In some implementations, peripheral device 410 may include multiple bus interfaces for communicating with multiple external entities. These multiple bus interfaces may implement the same local bus protocol, different local bus protocols, or a combination of the same and different bus protocols.

The device functions 412 may include hardware and/or software for implementing features available to peripheral device 410. The device functions 412 may, for example, include physical connectors for connecting to devices such as printers, monitors, external storage drives, network cables, and other input, output, and/or networking devices. The device functions 412 may further include hardware and/or software configured to implement a protocol for communicating with externally connected devices or functions. For example, the device functions 412 may implement a network interface for communicating with network equipment, such as switches, routers, modems, and/or wireless access points. Alternatively or additionally, the device functions 412 may include hardware and/or software configured to implement functionality provided directly by the peripheral device 410. For example, the device functions 412 may include hardware and/or software configured to implement a solid state hard drive. In some implementations, peripheral device 410 may include multiple device functions, each configured to provide different functionality. For example, in these implementations, peripheral device 410 may include device functions for communicating with a wired Ethernet network, device functions for communicating with a wireless 802.11 network, and device functions providing a storage array.

In some implementations, peripheral device 410 is a PCI-based device. In these implementations, peripheral device 410 includes a PCI interface for communicating with a host device such as host 110/210.

A PCI-based device may include one or more functions. A "function" describes operations that may be provided by peripheral device 410. Examples of functions include mass storage controllers, network controllers, display controllers, memory controllers, serial bus controllers, wireless controllers, and encryption and decryption controllers, among others. In some cases, a PCI device may include more than one function. For example, a PCI device may provide a mass storage controller and a network adapter. As another example, a PCI device may provide two storage controllers, to control two different storage resources.

In some implementations, peripheral device 410 may include single-root I/O virtualization (SR-IOV). SR-IOV is an extended capability that may be included in a PCI device. SR-IOV allows a physical resource (e.g., a single network interface controller) to appear as multiple resources (e.g., sixty-four network interface controllers). Thus, a PCI device providing a certain functionality (e.g., a network interface controller) may appear to a device making use of the PCI device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that lack configuration resources, and are generally controlled by the configuration of their underlying physical functions. Each of the physical functions and/or virtual functions may be assigned to a respective thread of execution (such as for example, a virtual machine) running on a host device.

Figure 5:
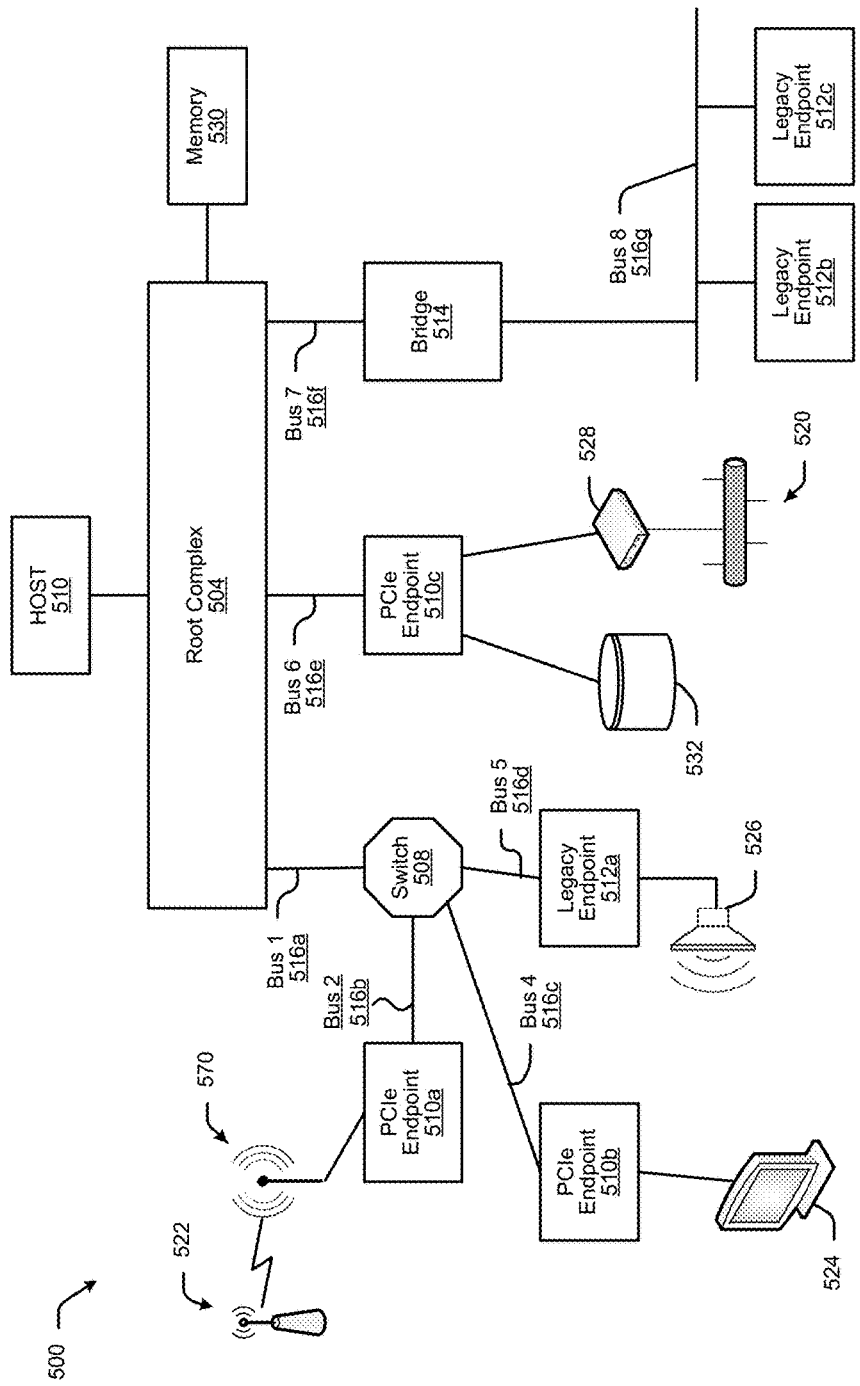
FIG. 5 illustrates an example of a computing system that includes multiple peripheral devices.

FIG. 5 illustrates an example of a computing system 500 that includes multiple peripheral devices. Peripheral devices may include hardware devices and/or devices that include a combination of hardware and software, which can be attached to a computing system to add functionality to the computing system 500. Examples of peripheral devices include storage devices, displays, speakers, wired and/or wireless network adapters, adapters to provide additional ports to the system (such as serial and/or parallel ports), bridges, hubs, and/or switches that provide ports for additional peripheral devices, and others. Generally, peripheral devices can be connected and disconnected from the computing system to change the functionality of the system. In some cases, the computing system must be powered down for a peripheral device to be added or removed. In other cases, the peripheral device can be attached or removed while the computer system is powered on (often referred to as "hot-swapping" or "hot-plugging"). Features of the peripheral devices illustrated in FIG. 5 are examples that may be used as devices 120 and 220.

The example in FIG. 5 illustrates a computing system 500 that includes peripheral devices that implement one or more variations of the Peripheral Component Interconnect (PCI) standard bus protocols. A bus is a communication channel that transfers data within a computing system, or between a computing system and other devices. A standard bus protocol is a data transfer protocol for which a specification has been defined and adopted by various manufacturers. Manufacturers ensure that compliant devices are compatible with computing systems implementing the bus protocol, and vice versa. PCI describes a family of related, standardized bus protocols. PCI includes the original PCI standard, PCI-eXtended (PCI-X), Accelerated Graphics Port (AGP), and PCI Express (PCIe, also referred to as PCI-XP). The term "PCI" or "PCI-based" may be used herein to describe any protocol in the PCI family of bus protocols. In the example shown in FIG. 5, PCI is provided as an example of a bus protocol that can be implemented by a computing system to connect to peripheral devices. A computing device can use other bus protocols, such as for example, Industry Standard Architecture (ISA), Extended ISA (EISA), Video Electronics Standards Association (VESA), Micro Channel, and any of the Advanced Technology Attachment (ATA) family of protocols, among others. The illustrated example can also be implemented with a combination of standard bus protocols, a combination of proprietary bus protocols, and/or a combination of standard and proprietary bus protocols.

The example computing system 500 may include host 510, a root complex 504, a memory subsystem 530, a switch 508, a bridge 514, and a number of peripheral devices. In this example, the peripheral devices include PCIe endpoints 510*a-c* and legacy endpoints 512*a-c*. Processors in host 510 may be general purpose computing devices such as are manufactured by Intel®, AMD®, ARM®, Qualcomm®, and others. The processors are generally capable of executing software code. A processor may include multiple processing cores. Host 510 and memory 530 are examples of host 110/210, and memory 130/230/330, respectively.

The root complex 504 may be a hardware device or a hardware and software device that connects host 510 and the memory subsystem 530 to the peripheral devices. The peripheral devices may be connected directly to the root complex 504. For example, the PCIe endpoint 510*c* is connected directly to the root complex 504. Alternatively or additionally, the peripheral devices may be connected to the root complex 504 through a switch 508. A bridge 514 may also be connected to the root complex 504. The root complex 504 may forward transactions to host 510 and direct responses from host 510 back to the peripheral devices. First write transaction 160 and second write transaction 170 may be routed to peripheral devices through switch 508 or bridge 514. The root complex 504 may further generate transactions on behalf of host 510, and forward responses to those transactions back to host 510. In some cases, the root complex 504 may also route transactions from one peripheral device to another, and/or between peripheral devices, switches, and bridges. The root complex 504 may provide services for the computer system 500, such as a hot plug controller, a power management controller, an interrupt controller, and/or error detection and reporting. In some implementations, the root complex 504 may be implemented as part of a host system that includes one or more integrated processors and memory.

The memory subsystem 530 may provide temporary or long-term storage for data that may be used by the computing system 500. The memory subsystem 530 may include Dynamic Random Access Memory (DRAM), Synchronous DRAM (SDRAM), and/or Double Data Rate (DDR), among others. In some cases, the memory subsystem 530 may also include Read-Only Memory (ROM), such as Programmable Read-Only Memory (PROM), Erasable Programmable Read-Only Memory (EPROM), Electrically Erasable Programmable Read-Only Memory (EEPROM), and/or Flash EEPROM, among others. In some implementations, the root complex 504 may include a memory controller to manage transactions to and from the memory subsystem 530.

The switch 508 functions as a multi-port connector between various devices, including the root complex 504, peripheral devices, and possibly other switches and bridges. The switch 508 may route transactions between any of the devices connected to it. For example, the switch 508 may route transactions between the PCIe endpoints 510a-b and the legacy endpoint 512a, and between the various endpoints 510a-b, 512a and the root complex 504. The switch 508 may also provide arbitration to prioritize incoming and outgoing transactions. Devices connected to the switch 508 may treat the switch 508 as another requester and/or completer. Though not illustrated here, switches can also be connected to other switches to further expand the number of peripheral devices that can be connected to the computing system 500.

The bridge 514 may provide connectivity to other busses or switching fabrics. The other busses or switching fabrics may implement a PCI variant or another protocol. For example, in the example of FIG. 5, the bridge 514 provides connectivity to a bus implementing the original PCI standard. The bridge 514 may include mechanisms to translate from one bus protocol, such as the original PCI standard, to another protocol, such as PCIe.

Components in the computing system 500 may be connected through a shared bus. For example, in the illustrated example, the legacy endpoints 512b-c are connected to a shared PCI bus 516g. Alternatively or additionally, peripheral devices may be connected to the computing system 500 in a switching fabric topology. The interconnected devices illustrated in FIG. 5, including the root complex 504, the switch 508, the bridge 514, and the PCIe endpoints 510a-c, form an example of a switching fabric. A switching fabric topology includes point-to-point connections between the devices connected to the fabric, and may include a routing system for passing messages between the devices. In a switching fabric, transactions may be spread across multiple physical links. In the example of FIG. 5, the switch 508 is connected to the root complex 504 with Bus 1 516a and the PCIe endpoint 510c is connected to the root complex with Bus 6 516e. Similarly, the bridge 514 is connected to the root complex with Bus 7 516f. Each of the PCIe endpoints 510a-b and the legacy endpoint 512a are also connected to the switch 508a with individual busses 516b-d. The connections between each of the root complex 504, the switch 508, the bridge 514, the PCIe endpoints 510a-c, and the legacy endpoint 512a are point-to-point because each of the busses 516a-g are not shared with another device. Furthermore, a packet directed from one device to another (for example, from the root complex 504 to the PCIe endpoint 510a) is routed directly to its destination.

In some implementations, the connections between the devices in the computing system 500 may be numbered. For example, in the illustrated example, the connection between the switch 508 and the root complex 504 is labeled Bus 1 516a (Bus 0 may be internal to the root complex 504). Similarly, each of the busses connecting the PCIe endpoints 510a-b and the legacy endpoint 512a to the switch 508 are labeled Bus 2 516b, Bus 4 516c, and Bus 5 516d, respectively (Bus 2 may be internal to the switch 508). Furthermore, the connection between the root complex 504 and the PCIe endpoint 510c may be labeled Bus 6 516e, while the connection between the root complex and the bridge 514 may be labeled Bus 7 516f. Finally, the shared bus downstream from the bridge 514 may be labeled Bus 8 516g. In most cases the numbering of the busses is arbitrary, though bus numbers are generally assigned in a logical fashion. For example, Bus 0 may be located within the root complex 504, and the bus label may increment as the distance between the bus and the root complex 504 increases.

As noted above, peripheral devices may add to and/or modify the functionality of the computing system 500. For example, one PCIe endpoint 510a may implement a Wi-Fi adapter 570. Using the Wi-Fi adapter 570, the computing system 500 may be able to communicate wirelessly with a wireless access point 522, and thereby access a network. As another example, another PCIe endpoint 510b may implement a video card. A video card may include a port to connect a monitor 524 or other display device. As a further example, the computing system 500 may include a legacy endpoint 512a that implements a sound card. A sound card may include a port or jack that accepts a plug for a speaker 526 or other audio output device.

In some cases, a PCIe endpoint may be a multi-function device, that is, a device that provides the services of multiple devices. For example, the PCIe endpoint 510c may include an Ethernet adapter, and provide a connection to a gateway device 528, such as a DSL or cable modem. The PCIe endpoint 510c may also include a storage adapter, and provide a connection to a storage device 532. The one PCIe endpoint 510c thus may provide access to a network 520, as well as access to a storage device 532. The hardware and/or software components in the peripheral device that provide the services of, for example, a network interface or a storage controller may be called a "function." In the context of PCI devices, the terms "function" and "service" may be synonymous, though in other contexts this is not necessarily the case. Types of functions that may be provided by a peripheral device include, for example, mass storage controllers, network controllers, display controllers, multimedia devices, memory controllers, bridges, input devices docking stations, serial bus controllers, wireless controllers, satellite communications controllers, and encryption/decryption controllers, among others. In some implementations, functions can be added to a peripheral device, for example by connecting daughter cards or external devices to expansion slots or external ports on the peripheral device. In some implementations, a multi-function PCI device may provide up to eight separate functions. In many implementations, the functions provided by a peripheral device may be identified by a function number.

When a computing system such as computing system 500 illustrated in FIG. 5 initially powers up, host 510 may be unaware of any peripheral devices that are connected to the system. Host 510 may be aware of the root complex 504, and possibly also that the root complex 504 is connected to one or more busses. To learn about the rest of the system, Host may execute a process to scan and configure the system. This process may be referred to as an enumeration process. The specific process of scanning for, locating, and identifying peripheral devices may be called discovery or discovering. During an enumeration process, software executing on the host 510 may first scan each of the busses 516*a*, 516*e*, 516*f* connected to the root complex 504, and identify the switch 508, the PCIe endpoint 510*c*, and the bridge 514. Upon discovering the switch 508, host 510 may next scan the busses 516*b-d* connected to the switch 508. Host 510 thereby discover the PCIe endpoints 510*a-c* and the legacy endpoint 512*a*. Upon discovering the bridge 514, host 510 may also scan Bus 8 516*g*; however, the bridge 514 may translate the scanning instructions to the protocol implemented by Bus 8 516*g*.

While scanning the busses, or possibly after, host 510 may also transmit configuration transactions to each of the devices it discovers. Configuration may include, for example, assigning one or more address spaces. For example, PCI devices typically include one or more of a memory address space and/or an I/O address space. Specific registers (e.g. Register 129) of peripheral device memory may be reserved during a configuration transaction in an initialization procedure. Each of these address spaces may be subdivided into multiple blocks. These address spaces and address space blocks may each be assigned a base address, where the base address establishes the region of memory that is assigned to the address space. In some implementations, these base addresses may be stored in configuration registers in a configuration space included in a device. Software executing on host 510 may be responsible for managing all available memory, and, for example, ensuring that no two devices are assigned overlapping memory regions. Alternatively or additionally, memory may be managed by a memory controller.

Configuration may further include programming information, such as a bus number and/or a device number, into configuration registers included in the peripheral devices. During configuration, host 510 may also read information from configuration registers. For example, the PCIe endpoint 510*c* may include a configuration register that indicates that it has two functions. The PCIe endpoint 510*c* may further include separate configuration registers for each function. Each function's configuration registers may further include information that indicates the capabilities of each function. For example, a configuration register may indicate that Function 0 is a mass storage controller, and another configuration register may indicate that Function 1 is a network interface. In most implementations, configuration registers are included in the hardware of a device.

In some implementations, the switch 508 and the bridge 514 also include a configuration space with configuration registers. In such implementations, host 510 may discover the switch and bridge functionality by reading configuration registers in the switch 508 and the bridge 514. The switch 508 and the bridge 514 may also be configured by host 510, for example with bus and device numbers.

Figure 6:
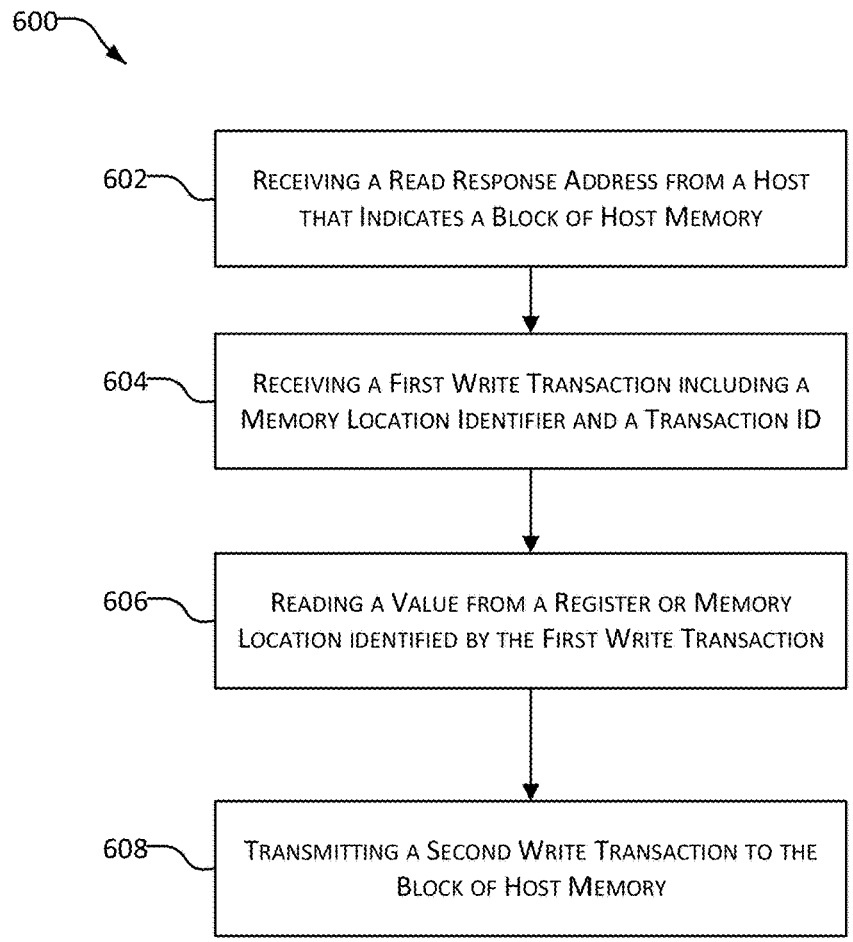
FIG. 6 illustrates an example flow chart demonstrating an example process transferring data from a peripheral device to a host memory.

FIG. 6 depicts an illustrative flow chart demonstrating an example process 600 of transferring data from a peripheral device to a host memory. The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 600 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by devices 120 or 220. The code may be stored on a computer-readable storage medium of device 120 or 220, for example, in the form of a computer program including a plurality of instructions executable by one or more processors. The computer-readable storage medium may be non-transitory.

In process block 602, a read response address is received from a host (e.g. host processing logic 110) at a bus interface of a device (e.g. device 120). The read response address indicates a block of host memory (e.g. memory 130) for receiving values that are read from a device memory (e.g. memory 123). The device may store the read response address in device memory for future reference so that the device can send values to the read response address in host memory in a second write transaction. The device may receive the read response address from the host during an initialization protocol during a startup period.

In process block 604, a first write transaction is received by a register (e.g. reserved register 129) or a memory location of the device memory. The first write transaction includes a transaction identifier (e.g. 163) and a memory location identifier (e.g. 167). The memory location identifier identifies a second register of the device or second memory location of the device memory that the host would like to read a value from. The register or memory location of the device memory may be reserved by the host prior to the host sending the first write transaction. The register or memory location may be reserved only for write transactions that are part of the "readless operation" described in the disclosure. In other words, when a write transaction is written to the register, the device knows that it should send a second write transaction to the host memory that returns a value indicated by the memory location identifier sent to the reserved register or reserved memory location. The register or memory location may be reserved by the host during a initialization protocol during a startup period.

In process block 606, the value is read from the second register or second memory location in response to receiving the first write transaction. The second register or second memory location is identified by the memory location identifier. In process block 608, the second write transaction is transmitted, via a bus interface (e.g. 244) to the block of host memory indicated by the read response address. The second write transaction is transmitted to the host memory over a bus (e.g. bus 150).

Of course, the disclosed "readless operation" of sending a first write transaction to a device (from a host) and having the device send a second write transaction to the host memory can be executed repeatedly by a computing system (e.g. 200) as a method of reading different registers from a device memory. Hence, to perform a second "readless operation" a third write transaction may be sent from the host to the device. The third write transaction may include a second transaction identifier that is different from the transaction identifier sent in the first write transaction and a second memory location identifier that identifies a third register or third memory location that is different than the second register or second memory location that identified by the memory location identifier sent in the first write transaction. The third write transaction may be received by the reserved register (e.g. register 129) or memory location that is reserved for writes that are part of readless operations. In response to determining that a write transaction has been received, the device may read a second value from the third register or third memory location. Then, a fourth write transaction may be transmitted by the bus interface of the device to the block of host memory indicated by the read response address that was sent by the host earlier. The fourth write transaction includes the second value (read from the third register or third memory location) and the second transaction identifier. The fourth write transaction may also include the second memory location identifier as further validation data.

In one embodiment, the first write transaction is initiated by a first virtual machine running on the host and the third write transaction is also initiated by the first virtual machine running on the host. The device driver that is ultimately responsible for sending the first and third write transactions may be running within a hypervisor (e.g. 314) or within the first virtual machines (e.g. 316A).

Figure 7:
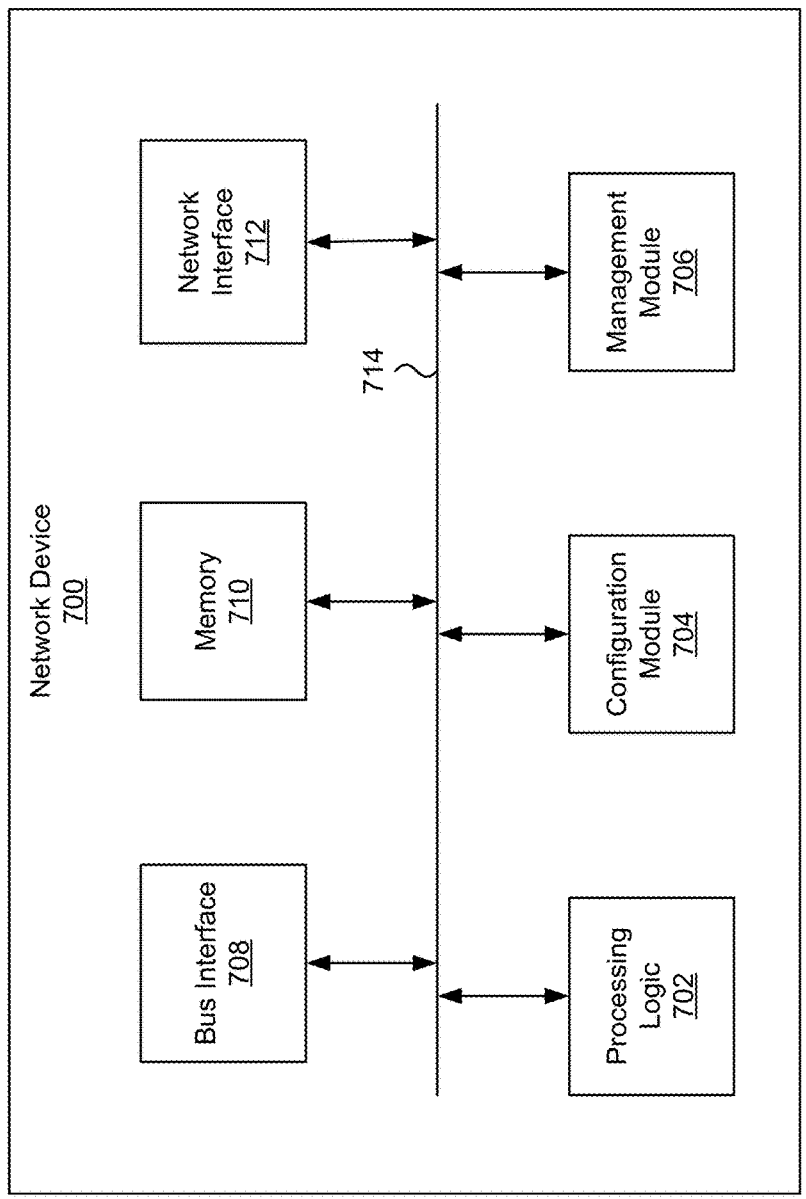
FIG. 7 illustrates an example of a network device, according to certain aspects of the disclosure.

FIG. 7 illustrates an example of a network device 700. Functionality and/or several components of the network device 700 may be used without limitation with other embodiments disclosed elsewhere in this disclosure, without limitations. For example, a device (e.g. 120, 220, and 410) may include all or some of the modules of network device 700. A network device 700 may facilitate processing of packets and/or forwarding of packets from the network device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 700 may be the recipient and/or generator of packets. In some implementations, the network device 700 may modify the contents of the packet before forwarding the packet to another device. The network device 700 may be a peripheral device coupled to another computer device, a switch, a router or any other suitable device enabled for receiving and forwarding packets.

In one example, the network device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The network device 700 may include additional modules, not illustrated here, such as components discussed with respect to the nodes disclosed in FIG. 8. In some implementations, the network device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network device 700, while in other cases some or all of the memory may be external to the network device 700. The memory 710 may store an operating system comprising executable instructions that, when executed by the processing logic 702, provides the execution environment for executing instructions providing networking functionality for the network device 700. The memory may also store and maintain several data structures and routing tables for facilitating the functionality of the network device 700.

In some implementations, the configuration module 704 may include one or more configuration registers. Configuration registers may control the operations of the network device 700. In some implementations, one or more bits in the configuration register can represent certain capabilities of the network device 700. Configuration registers may be programmed by instructions executing in the processing logic 702, and/or by an external entity, such as a host device, an operating system executing on a host device, and/or a remote device. The configuration module 704 may further include hardware and/or software that control the operations of the network device 700.

In some implementations, the management module 706 may be configured to manage different components of the network device 700. In some cases, the management module 706 may configure one or more bits in one or more configuration registers at power up, to enable or disable certain capabilities of the network device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the network device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 700 may include multiple network interface modules, each configured to communicate with a different network. For example, in these implementations, the network device 700 may include a network interface module for communicating with a wired Ethernet network, a wireless 802.11 network, a cellular network, an Infiniband network, etc.

The various components and modules of the network device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

Figure 8:
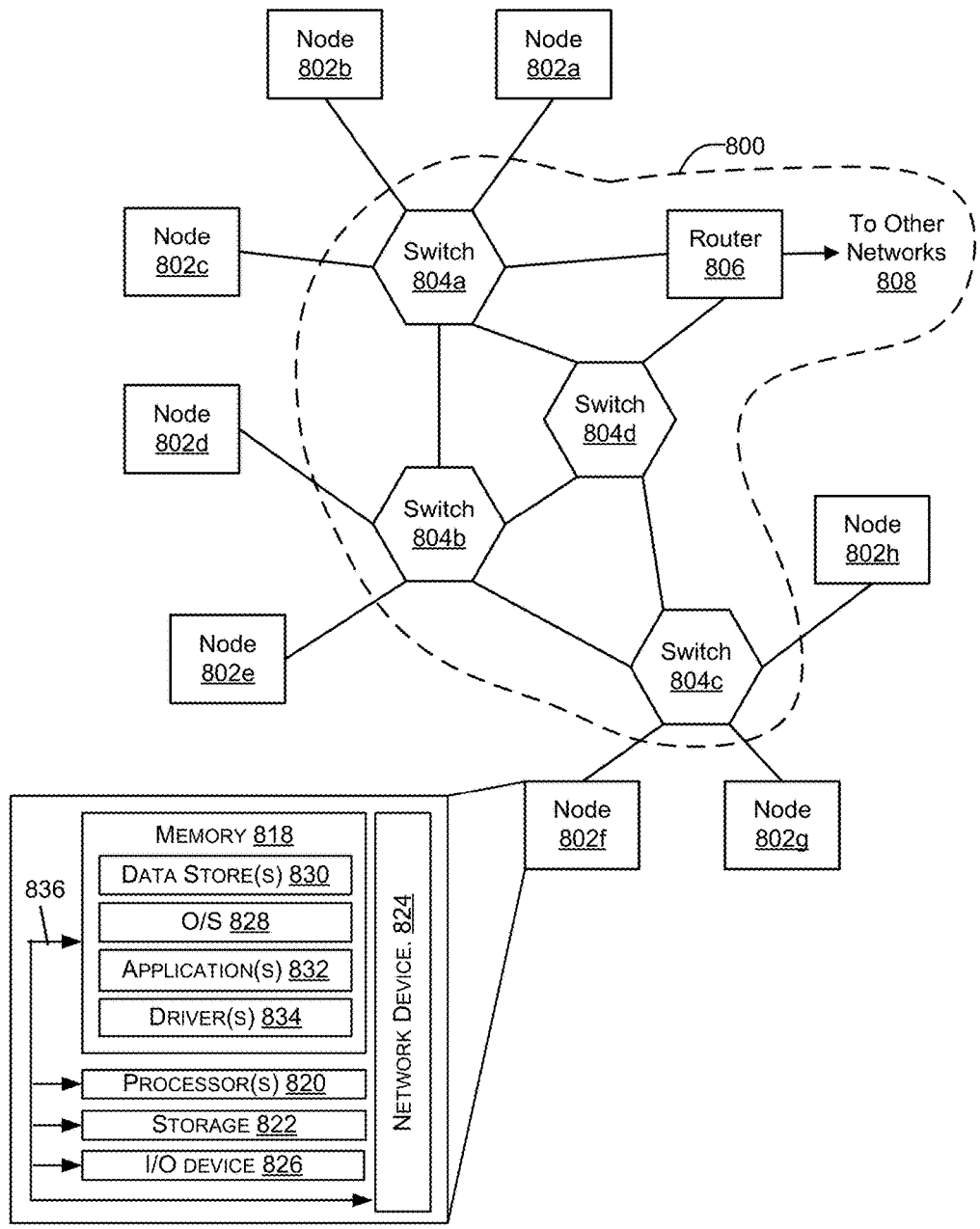
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of network devices 700 of FIG. 7, such as nodes comprising the network device, switches and routers. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device 700 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more network devices 700 for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources.

These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate.

The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800. The network device(s) 824 of FIG. 8 may include similar components discussed with reference to the network device 700 of FIG. 7.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. As used herein, PCI-based devices may also include devices that communicate using Non-Volatile Memory Express (NVMe). NVMe is a device interface specification for accessing non-volatile storage media attached to a computing system using PCIe. For example, the bus interface module 708 may implement NVMe, and the network device 824 may be connected to a computing system using a PCIe interface.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing system comprising:
    a host memory;
    a host processor configured to communicate with the host memory; and
    a driver running on an operating system of the host processor, wherein the driver is configured to:
        transmit a first write transaction to a first register or a first memory location of a peripheral device, the first write transaction including a transaction identifier and a memory location identifier; and
        receive from the peripheral device a second write transaction to a block of the host memory, wherein the memory location identifier identifies a second register or a second memory location of the peripheral device, and wherein the second write transaction includes the transaction identifier, the memory location identifier, and a value contained in the second register or second memory location.

2. The computing system of claim 1, wherein the memory location identifier identifies the second register or the second memory location by an offset value.

3. The computing system of claim 1, wherein the driver is further configured to:
    transmit a read response address to the peripheral device before transmitting the first write transaction, the read response address indicating the block of the host memory for receiving the value contained in the second register or second memory location.

4. The computing system of claim 1, wherein the host processor is configured to:
    read the transaction identifier from the block of the host memory;
    read the value from the block of the host memory; and
    execute a function that utilizes the value.

5. The computing system of claim 4, wherein the host processor is further configured to:
    verify that the memory location identifier sent in the first write transaction matches the memory location identifier received in the second write transaction.

6. The computing system of claim 1, wherein the second write transaction is a direct memory access (DMA) write transaction.

7. The computing system of claim 1, wherein the driver is further configured to:
determine whether a response is received from the peripheral device within a predetermined period of time after transmitting the first write transaction; and
in response to determining that the response is not received from the peripheral device, cancel the first write transaction.

8. The computing system of claim 1, wherein the driver is further configured to:
determine whether a response is received from the peripheral device within a predetermined period of time after transmitting the first write transaction; and
in response to determining that the response is not received from the peripheral device, transmit a third write transaction having a retransmission transaction identifier different than the transaction identifier of the first write transaction.

9. The computing system of claim 1, wherein transmitting the first write transaction and receiving the second write transaction is performed synchronously.

10. The computing system of claim 1, wherein transmitting the first write transaction and receiving the second write transaction is performed asynchronously.

11. A method for reducing read transactions to a peripheral device, the method comprising:
transmitting, by a driver running on an operating system of a host processor of a computing system, a first write transaction to a first register or a first memory location of a peripheral device, the first write transaction including a transaction identifier and a memory location identifier; and
receiving, by the driver, a second write transaction to a block of host memory, wherein the second write transaction is received from the peripheral device, wherein the memory location identifier identifies a second register or a second memory location of the peripheral device, and wherein the second write transaction includes the transaction identifier, the memory location identifier, and a value contained in the second register or second memory location.

12. The method of claim 11, wherein the memory location identifier identifies the second register or the second memory location by an offset value.

13. The method of claim 11, further comprising:
transmitting, by the driver, a read response address indicating a block of a host memory for receiving the value, wherein the driver transmits the read response address before transmitting the first write transaction.

14. The method of claim 11, further comprising:
reading, by the host processor, the transaction identifier from the block of host memory;
reading, by the host processor, the value from the block of host memory; and
executing, by the host processor, a function that utilizes the value.

15. The method of claim 14, further comprising:
verifying, by the host processor, that the memory location identifier sent in the first write transaction matches the memory location identifier received in the second write transaction.

16. The method of claim 11, wherein the second write transaction is a direct memory access (DMA) write transaction.

17. The method of claim 11, further comprising:
determining, by the driver, whether a response is received from the peripheral device within a predetermined period of time after transmitting the first write transaction; and
in response to determining that the response is not received from the peripheral device, cancel the first write transaction.

18. The method of claim 11, further comprising:
determining, by the driver, whether a response is received from the peripheral device within a predetermined period of time after transmitting the first write transaction; and
in response to determining that the response is not received from the peripheral device, transmit a third write transaction having a retransmission transaction identifier different than the transaction identifier of the first write transaction.

19. The method of claim 11, wherein the transmitting the first write transaction and the receiving the second write transaction is performed synchronously.

20. The method of claim 11, wherein the transmitting the first write transaction and the receiving the second write transaction are performed asynchronously.

* * * * *